United States Patent
Woolard et al.

(10) Patent No.: US 8,597,609 B2
(45) Date of Patent: Dec. 3, 2013

(54) NON-POLAR CAPPED NANO TRANSITION METAL OXIDES AND SULFIDES

(75) Inventors: Christopher Dennis Woolard, Port Elizabeth (ZA); Damien Christopher Williams, Port Elizabeth (ZA); Jason Leigh van Rooyen, Port Elizabeth (ZA); Katherine Garde, Port Elizabeth (ZA); Robert Michael Bosch, Port Elizabeth (ZA); Stefanus Hendrik Josephus Strydom, Port Elizabeth (ZA)

(73) Assignee: Rubber Nano Products (Proprietary) Limited, Port Elizabeth (ZA)

( * ) Notice: Subject to any disclaimer, the term of this patent is extended or adjusted under 35 U.S.C. 154(b) by 611 days.

(21) Appl. No.: 12/302,010

(22) PCT Filed: May 22, 2007

(86) PCT No.: PCT/IB2007/051932
§ 371 (c)(1),
(2), (4) Date: Aug. 17, 2010

(87) PCT Pub. No.: WO2007/135649
PCT Pub. Date: Nov. 29, 2007

(65) Prior Publication Data
US 2010/0305332 A1    Dec. 2, 2010

(30) Foreign Application Priority Data

May 23, 2006    (ZA) ................................. 2006/04138

(51) Int. Cl.
*C01G 11/02*    (2006.01)
(52) U.S. Cl.
USPC ..................................... 423/594.18; 423/622

(58) Field of Classification Search
USPC .............. 423/593.1, 604–610, 623, 632–636, 423/594.17, 594.18, 594.19, 4; 977/773, 977/775, 776
See application file for complete search history.

(56) References Cited

U.S. PATENT DOCUMENTS 6,710,091 B1    3/2004    Womelsdorf et al.

FOREIGN PATENT DOCUMENTS

CN              1386768 A    12/2002
WO       WO 2007/135650 A    11/2007

OTHER PUBLICATIONS

Laudsie, R. A., et al. "Hydrothermal Synthesis of Zinc Oxide AKD Zinc Sulfide". The Journal of Physical Chemistry. vol. 64 (1960) pp. 688-691.*

(Continued)

*Primary Examiner* — Stanley Silverman
*Assistant Examiner* — Richard M Rump
(74) *Attorney, Agent, or Firm* — Kilpatrick Townsend & Stockton LLP

(57) ABSTRACT

The present invention relates to a method for the preparation of a functionalized nano size transition metal oxide or sulfide particle comprising the steps of (a) providing a ternary solvent system comprising a polar solvent, a non-polar solvent and an intermediate solvent allowing miscibility of all three components; (b) providing a mixture of a transition metal salt and a ternary solvent; (c) providing a mixture of a suitable source of oxide or sulfide and the ternary solvent; (d) providing a mixture of a non-polar end capping agent and the non-polar solvent; (e) mixing the mixtures; and (f) recovering the resultant functionalized nano size transition metal oxide or sulfide particle. The invention further relates to non-polar end capped nano sized transition metal oxide or sulfide particle so produced and the use of such particles.

27 Claims, 3 Drawing Sheets

(56) References Cited

OTHER PUBLICATIONS

Figure 1:
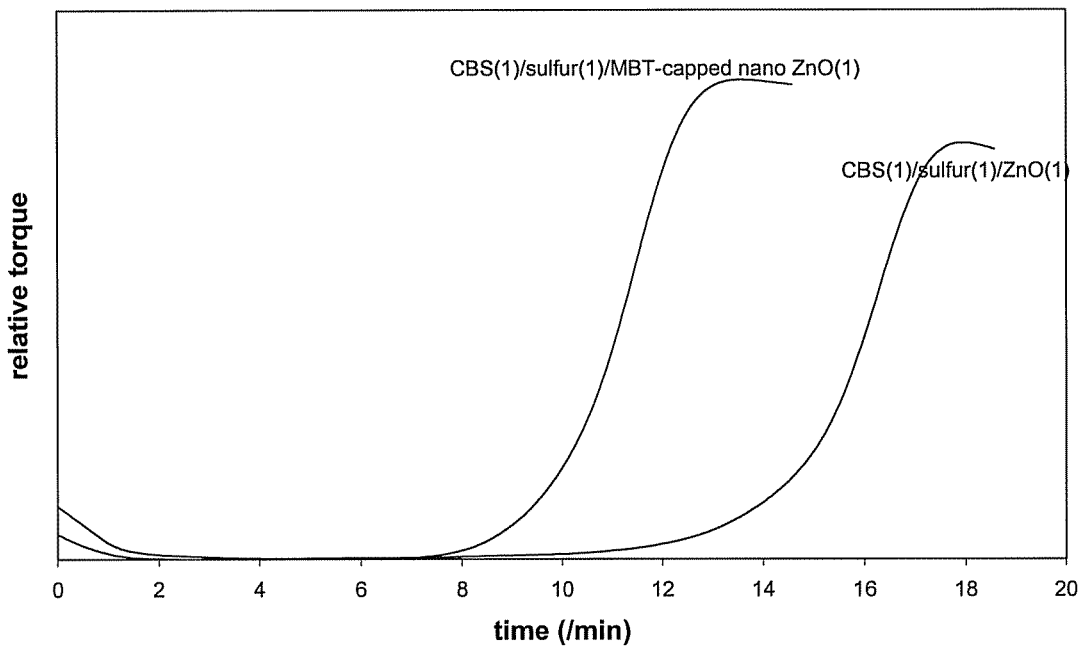

Niederberger, M., et al. "Nonaqueous synthesis of metal oxide nanoparticles: Review and indium oxide as case study for the dependence of particle morphology on precursors and solvents". J Sol-Gel Sci Techn (2006) 40:259-266.*

Niederberger, M., et al. "Nonaqueous Sol—Gel Routes to Metal Oxide Nanoparticles". Acc. Chem. Res. 2007, 40, 793-800.*

Chinese Office Action mailed on Apr. 19, 2010 for Chinese Patent Application No. 200780018593.2, with English translation, 14 pages.

Mukhitdinov, A.A., et al., "Possibility of reducing the amount of zinc oxide in rubber mix formulations;" 1994; *International Polymer Science and Technology*; vol. 21; No. 7; pp. T48-T51.

Published JP translation of PCT Int'l Publication No. 2002-537219.

JP Laid-open Patent Application Publication No. 2000-290014.

JP Laid-open Patent Application Publication No. 04-357114.

Japanese Office Action mailed Nov. 6, 2012 in JP Application No. 2009-511638.

* cited by examiner

NON-POLAR CAPPED NANO TRANSITION METAL OXIDES AND SULFIDES

CROSS-REFERENCE TO RELATED APPLICATIONS

This application is a National Stage of International Application No. PCT/IB2007/051932, filed May 22, 2007, and which claims the benefit of South African Patent Application No. 2006/04138, filed May 23, 2006, the disclosures of both applications being incorporated herein by reference.

INTRODUCTION

This invention relates to a process for the preparation of non-polar capped nano transition metal oxides and sulfides. In particular, the invention relates to the preparation of non-polar capped nano transition metal oxides and sulfides using a polar/non-polar miscible solvent system.

BACKGROUND TO THE INVENTION

A material is classed as nano when one of its dimensions exists in the nanometer range, i.e. is less than 100 nm.

Various methods exist to create nano sized materials. Zinc oxide (ZnO) is a particularly preferred nano sized material because it has various applications, including ultra-violet light absorbers in plastics, coating and paints. Zinc oxide is particularly useful as an activator in rubber vulcanization. In the case of zinc oxide, there are two main types of manufacture methods:

1. A gas stream process which uses a plasma stream of hot starting materials and regulates the particle size by temperature and flow rates, and
2. A sol-gel system which uses precipitation of the zinc oxide, out of a suitable solvent system in which the starting materials are dissolved.

In the method 2 above, it is often a necessity to use a suitable chemical agent to prevent the growth of crystals formed during such a reaction to limit the particle size that is achieved. This is done by introducing this chemical agent at a suitable time to allow interference with the crystal growth process. This is called capping, and many different chemical agents have been used.

In the specific case of zinc oxide by this sol process, a suitable zinc salt (like zinc acetate) is reacted with sodium hydroxide in a polar solvent mixture of water and some other alcohols. The choice of solvent is often determined by what is safer and cheaper to use.

In rubber vulcanization the use of zinc oxide is essential as it plays an important role in activating the vulcanization reaction by its role as an intermediate in the reactions of the accelerators, sulfur and the rubber. The amount of zinc oxide is essentially of the range 2 to 5 parts per hundred of rubber by mass. Considering current environmental considerations, it has become desirous to limit the zinc oxide amounts as it is potentially a toxic material in aquatic systems. While other metal oxides exists which can replace the role of zinc oxide, they are considerably more toxic to the environment.

The drive to use zinc oxide was dominated by the knowledge that the vulcanization reactions in the rubber material are related to the surface area of the zinc oxide—hence a nano zinc oxide should have a far greater available surface area per mass and this should favourably affect the vulcanization. However, this was not the case because pure nano zinc oxide had very small effects on the vulcanization which rendered the use of the material unsuitable, considering the cost.

When the reaction mechanism is considered for rubber vulcanization, the main intermediate on the zinc oxide surface is a zinc-accelerator intermediate which facilitates the vulcanization reaction. One of the earliest accelerators used in rubber vulcanization is 2-mercaptobenzothiazole (MBT) which accelerates the reaction between sulfur and diene rubbers. In particular, MBT accelerates the reaction of sulfur with rubber. ZnO in turn catalyses this reaction.

When nano zinc oxide is formed by method 2 (above) the capping agent is predominantly a sulfur based material as a result of the good bond between zinc and sulfur. The choice of capping agent is however limited by the polarity of such a material in that such material must be soluble in the (polar) solvent used. To date this has not been perceived as a problem in the art as there are many thiols available and most are soluble in polar solvents.

However, to date there has been no teaching in the art to cap the ZnO with non-polar materials which can be advantageously used in vulcanized rubber formulations. These materials have no or limited solubility in aqueous or alcoholic solvents.

SUMMARY OF THE INVENTION

According to the present invention there is provided a process for the preparation of a functionalized nano size transition metal oxide or sulfide particle.

This process is used to introduce a non-polar end capping agent on a polar crystal formed during the sol process. This allows the normal capping of the crystal growth to regulate size but also allows introduction of specific chemical groups effectively functionalizing the nano particle formed.

The process comprises the following steps:
1. providing a ternary solvent system comprising a polar solvent, a non-polar solvent and an intermediate solvent allowing miscibility of all three components;
2. providing a mixture of a transition metal salt and the ternary solvent;
3. providing a mixture of a suitable source of oxide or sulfide and the ternary solvent;
4. providing a mixture of a non-polar end capping agent and the non-polar solvent;
5. mixing the mixtures; and
6. recovering the resultant functionalized nano size transition metal oxide or sulfide particle.

Timing of the addition of the capping agent is important so that growth can be stopped at the right stage. Too long a reaction time does not result in nano material at all. The capping time is therefore essential while nucleation of the crystals is taking place otherwise 0.56 micro zinc oxide results.

In one embodiment of the present invention, step 5 comprises mixing 2 and 3 to create a mixture 5 and adding 4 to 5. In an alternate embodiment of the present invention step 5 is replaced by adding a portion, e.g. half of 4 to 2. 3 and 4 are then added alternately to precipitate the oxide or the sulfide (see examples 2 to 5).

The solvent system used can be related to any three component system in which one component is polar, the other component is non-polar and an intermediate solvent is used to allow miscibility of all three components. Preferably the solvent is a water/alcohol/chlorinated alkane system.

In one embodiment of the present invention, a mixture of water, iso-propanol and dichloromethane is used. The water and iso-propanol allow dissolution of zinc acetate (or other transition metal salt) and sodium hydroxide while the dichloromethane allows dissolution of the vulcanization accelerator, MBT. However, it will be appreciated that any other suitable solvents will accomplish the same effects (such as ethanol, methanol, n-propanol, ethylene glycol, butanol, chloroform and dichloroethane). Preferably a ratio of 60:30:10 of isopropanol:water:dichloromethane is used. It, however, will be appreciated that any suitable miscible ratio can be used.

Preferably the dichloromethane does not exceed 20% parts by weight, more preferably not more than 15% parts by weight, most preferably not more than 10% parts by weight. Beyond these values the system is no longer miscible and separates into 2 phases. Preferably dichloromethane is present in an amount of 1-10% parts by weight.

Increasing the water also limits dichloromethane solubility. In a preferred embodiment of the present invention, the system includes 60-80% isopropanol, 20-30% water and 1-10% dichloromethane (all parts by weight).

Any soluble transition metal salt can be used but preferably the transition metal salt is zinc acetate or cadmium acetate.

A suitable source of oxide or sulfur can be any one of NaOH, LiOH, KOH, $NH_4OH$, $Na_2S$, $Li_2S$, $K_2S$, $H_2S$ and thioacetamide.

The non-polar capping agent is preferably useful in rubber vulcanization, for example, 2-mercaptobenzothiazole (MBT). Other suitable end capping agents include bis-benzothiazole-2,2'-disulfide, N-oxydiethylene-2-benzothiazole-sulfenamide, N-oxydiethylenethiocarbomoyl-N-oxydiethylene sulfenamide, tetramethyl thiuram disulfide, tetramethyl thiuram monosulfide, tetraethyl thiuram disulfide, tetraethyl thiuram monosulfide, tetrabenzyl thiuram disulfide, tetrabenzyl thiuram monosulfide, tetrabutyl thiuram disulfide, tetrabutyl thiuram monosulfide, tetraisopropyl thiuram disulfide, tetraisopropyl thiuram monosulfide, N-cyclohexylthiophthalimide, N-cyclohexyl-2-benzothiazole sulfenamide, N-tert-butyl-2-benzothiazole sulfenamide, 4-morpholinyl-2-benzothiazole disulfide, dipentamethylene thiuram disulfide, dipentamethylene thiuram monosulfide, dipentamethylene thiuram tetrasulfide, 4,4'-dithiomorpholine, 2-mercaptoluimidazole, ethylene thiourea, trimethylthiourea, 1,3-diethylthiourea, and 1,3-dibutylthiourea.

In a preferred embodiment of the present invention, the solvent system is premixed and then divided into two equal portions. In one portion the transition metal salt, for example, zinc acetate is dissolved and in the other portion the source of oxide or sulfide, for example, sodium hydroxide is dissolved. A small portion of dichloromethane is used to dissolve the MBT or other suitable non-polar capping agent. The amounts of reagents are preferably stoichometrically determined. The amount of MBT used is usually no more than 0.15 times the zinc acetate amount, preferably no more than 0.12 times, most preferably no more than 0.10 times the zinc acetate amount.

It is envisaged that any suitable agent can be used to perform this capping role. Most rubber accelerators and active ingredients are non-polar.

The temperature and time of reaction can be varied and should allow some control of the actual crystals formed. The normal reaction temperature of a zinc acetate mixture is between 30 and 50 degrees Centigrade (° C.) which temperature facilitates the solubility of the zinc acetate in the solvent mixture.

Because it is a ternary system the boiling point of dichloromethane is increased and it does not boil away. The temperature of the reaction can be as low as 0° C. but at lower temperatures less capping agent dissolves. As such, the method works between the freezing point and boiling point of the ternary solvent mixture prepared.

The time of the reaction is preferably no longer than 60 seconds, more preferably no longer than 40 seconds and most preferably no longer than 30 seconds before the non-polar capping agent, for example MBT solution, is added. The time of the reaction is preferably greater than 2 seconds, more preferably greater than 5 seconds, more preferably greater than 10 seconds and most preferably greater than 15 seconds.

The resultant sol-gel is preferably then heated under vacuum to allow the non-polar solvent, for example dichloromethane, to be removed and the resultant mixture of zinc oxide in water and isopropanol is then centrifuged and dried.

It is envisaged that this process can be applied to any sol-gel process to allow the end capping of nano materials with suitable non-polar reagents.

The present invention allows the manufacture of nano size materials with suitable chemical agents (functional groups) on their surface. By varying the solvent systems and starting materials, a large range of surface modified (functionalized) nano materials are possible. In the case of zinc oxide, a rubber vulcanization accelerator end capped zinc oxide was formed which displayed highly effective activation ability in the final rubber vulcanization reaction. A similar effective capped zinc sulfide was prepared.

The choice of solvent system and starting materials allows this process to end cap a large range of nano crystals via the sol-gel process as known in the art. Various post-process washing techniques known in the art, particular sol-gel technology, can be applied.

The process according to the present invention has been performed with a series of alcohols and with different solvent ratios. It has also been applied to two other vulcanization components, tetramethylthiuram disulfide (TMTD) and N-cyclohexylthiophthalimide (CTP). It has also been used where $Na_2S$ has replaced NaOH. This produces ZnS. ZnS has also been prepared where the $Na_2S$ solution is replaced with a stream of $H_2S$ gas. Another example has been the use of cadmium acetate to produce CdS.

According to a second aspect to the present invention there is provided a non-polar capped nano transition metal oxide or sulfide particle. Preferably the particle is prepared by a process according to the present invention.

According to a third aspect to the present invention there is provided use of a non-polar capped nano transition metal oxide or sulfide as an ultra-violet light absorber.

According to a fourth aspect to the present invention there is provided use of a non-polar capped nano transition metal oxide or sulfide in process for the manufacture of a rubber composition. Preferably the process is vulcanization.

The invention will now be described with reference to the following figures in which:

FIG. 1 is a comparison of rheometer cure curves obtained at 150° C. for the curing of synthetic cis-1,4-polyisoprene (IR). It shows that the onset of vulcanization (indicated by an increase of the torque required to oscillate the rubber in a rheometer) is significantly reduced when 1 parts per hundred rubber (phr) 2-mercaptobenzothiazole capped zinc oxide (example 1) is used as activator compared to when normal sized zinc oxide. The curative system used was 1 phr N-cyclohexyl-2-benzothiazole sulfenamide (CBS) and 1 phr sulfur. The rate of vulcanization indicated by the maximum slope of the rheometer cure curve is increased for the MBT-capped nano zinc oxide compared to ordinary ZnO. (Numbers in brackets refer to the part per hundred rubber of that component.)

Figure 2:
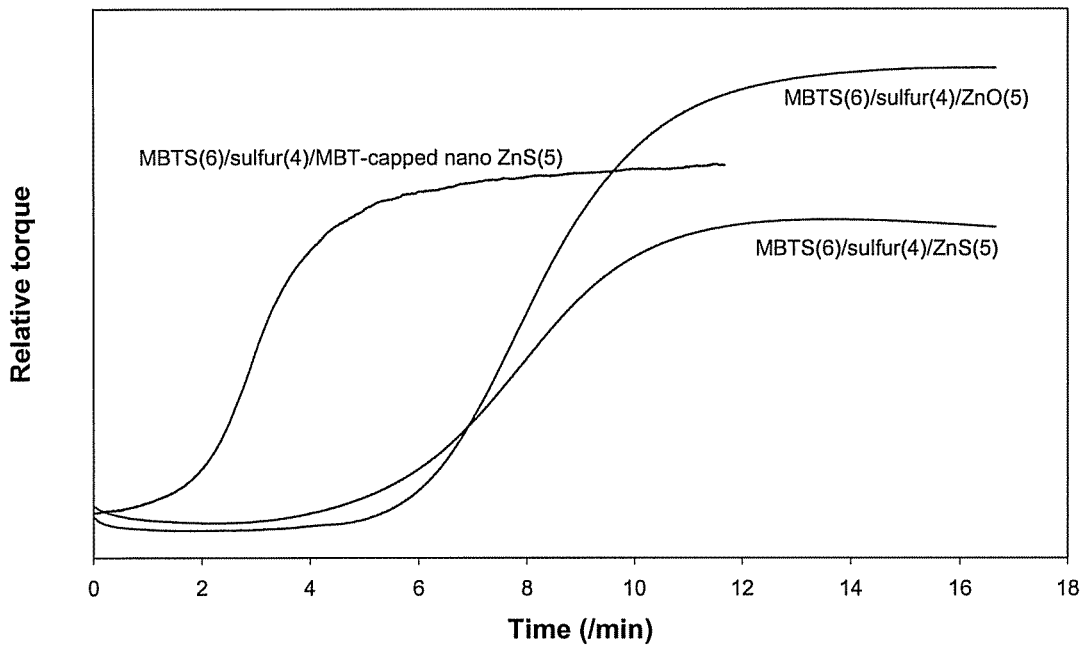

FIG. 2 is a comparison of rheometer cure curves obtained at 150° C. for the curing of natural rubber (NR). It shows that the onset of vulcanization (indicated by an increase of the torque required to oscillate the rubber in a rheometer) is significantly reduced when 5 parts per hundred rubber (phr) 2-benzothiazole capped zinc sulfide (example 2) is used as activator compared to when normal sized zinc oxide or zinc sulfide were used to vulcanize natural rubber. The curative system used was 6 phr bis-benzothiazole-2,2'-disulfide (MBTS) and 4 phr sulfur. It is also apparent that the rate of vulcanization indicated by the maximum slope of the rheometer cure curve is increased for the MBT-capped nano zinc sulfide compared to ordinary ZnS. (Numbers in brackets refer to the part per hundred rubber of that component.)

Figure 3:
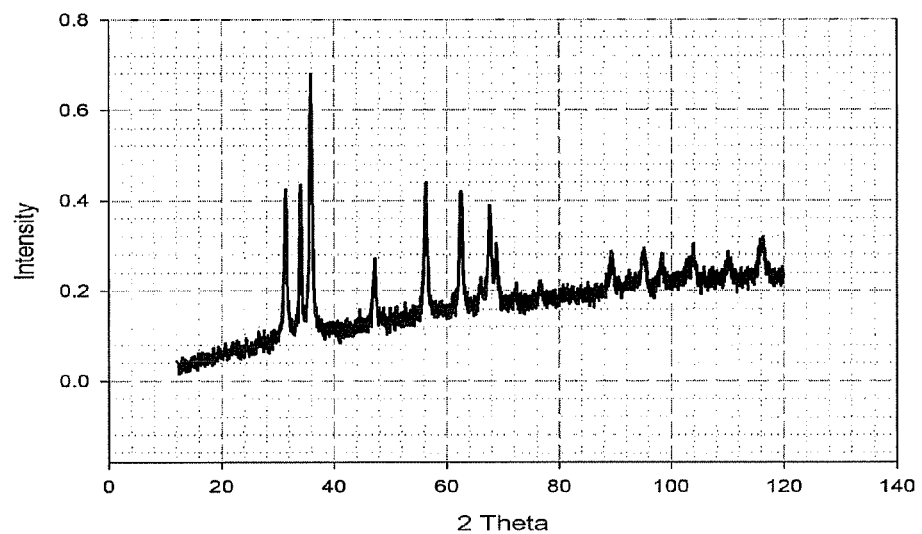

FIG. 3 is XRD of example 1-2-mercaptobenzothiazole capped ZnO consistent with base particle being hexagonal ZnO. TGA analysis and indicates the presence of some zinc bis(2-mercaptobenzothiazolate) ($Zn_2(mbt)_4$). Also indicated is the presence of some material of indeterminate form. This is likely amorphous since not seen in XRD.

Figure 4:
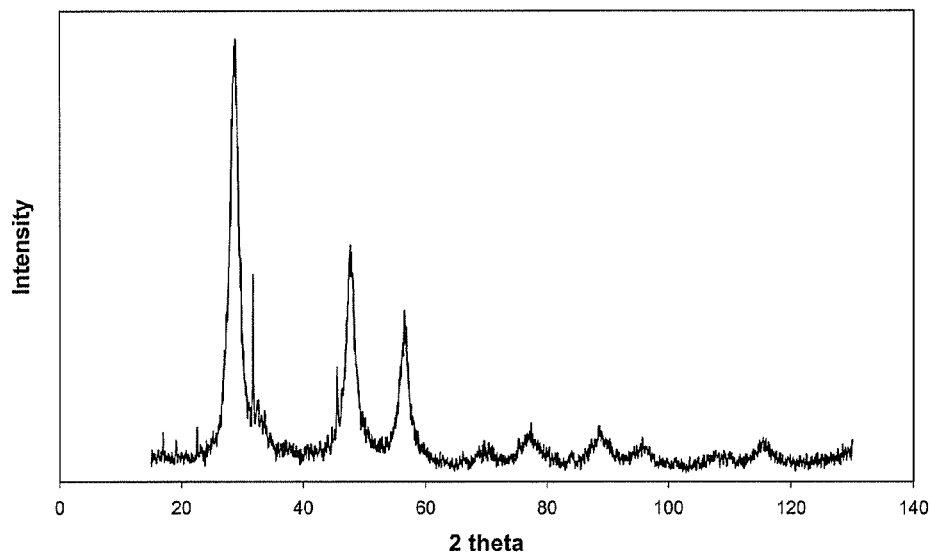

FIG. 4 is XRD of example 2-2-mercaptobenzothiazole capped ZnS consistent with base particle being sphalerite ZnS. XRD does not reveal the presence of capping agent. This is revealed by thermogravimetric analysis (TGA) where weight loss is measured as a function of temperature. The decomposition of different components is indicated by peaks in the derivative curve. Organic matter will decompose during heating whereas pure ZnO shows no mass loss except for the loss of adsorbed water below 100° C.

Figure 5:
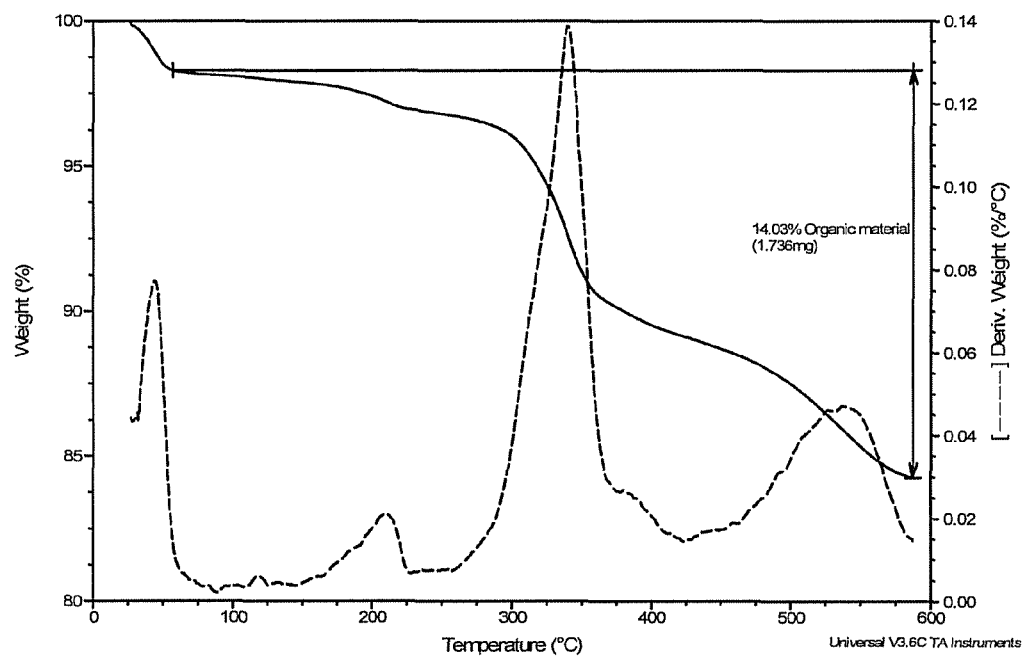

FIG. 5 is the TGA curve for Sample 1 heated at 10° C. min$^{-1}$ in nitrogen. The mass loss below 100° C. is adsorbed water. That near 220° C. is of adsorbed 2-mercaptobenzothiazole. That centred on 340° C. is consistent with the formation of zinc bis(2-mercaptobenzothiazolate) ($Zn_2(mbt)_4$). The decomposition near 380° C. indicates the presence of a complex between zinc and 2-mercaptobenzothiazole of indeterminate form. The large mass loss by 600° C. (14%) indicates the presence of an organic capping agent on the surface of the ZnO.

Figure 6:
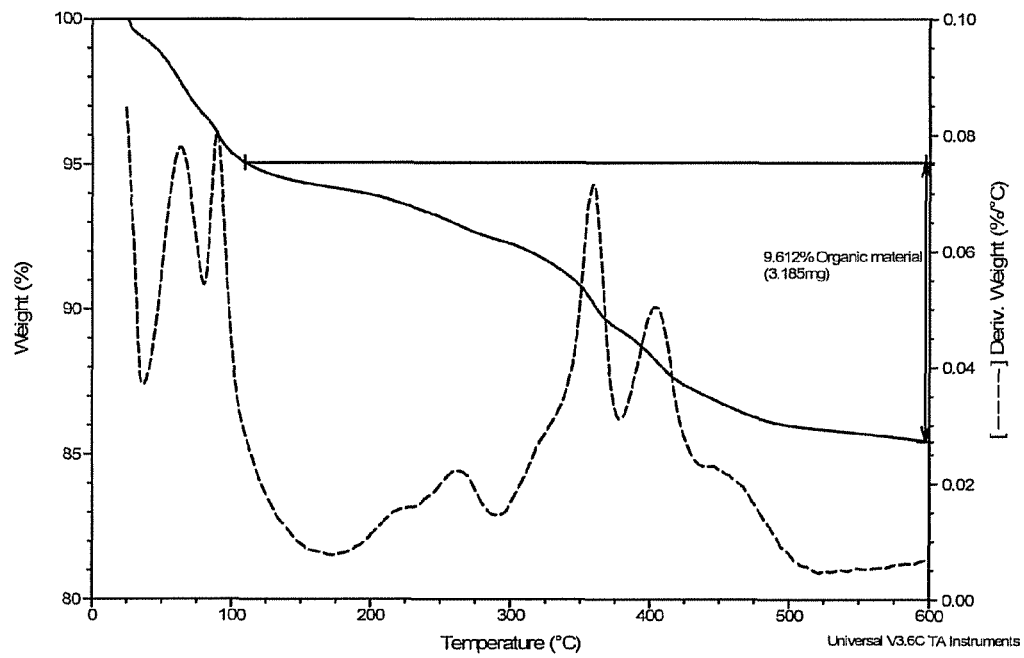

FIG. 6 is the TGA curve for Sample 2 heated at 10° C. min$^{-1}$ in nitrogen. Other than adsorbed water, mass losses associated with the decomposition of 2-mercaptobenzothiazole and zinc bis(2-mercaptobenzothiazolate) ($Zn_2(mbt)_4$) can be seen. The mass loss (DTG peak centred on 400° C.) indicates the presence of an unidentified complex between ZnS and 2-mercaptobenzothiazole.

The invention will now be described with reference to the following non-limiting examples.

EXAMPLE 1

570 mL of distilled water and 1080 mL iso-propanol were mixed together. 50 mL dichloromethane was added to this mixture. This solution was then divided into two equal portions which were heated to 50° C. 21.95 g zinc acetate was dissolved in one half to make solution A. 8.00 g sodium hydroxide was dissolved into the other half to make solution B. 1.67 g 2-mercaptobenzothiazole was dissolved in 130 mL dichloromethane to make solution C. Solution B was added to solution A while stirring with magnetic follower. After 30 seconds, solution C was added to the combination of A and B. Stirring was continued for a further 10 minutes. The mixture was then allowed to settle, the supernatant decanted and the residue was centrifuged. After excess solvent was removed, the resultant slurry was dried at 60° C. under vacuum. The yield of capped ZnO was 7.51 g.

EXAMPLE 2

190 mL distilled water and 380 mL iso-propanol were mixed together. This was then divided into two batches. Batch A comprised ⅔ the combined mixture and batch B comprised ⅓ the combined mixture. 5.52 g zinc acetate was added to batch A to make solution A and 7.36 g $Na_2S$ (60-62% assay) was added to batch B to make solution B. Both were covered and heated to 30-35° C. to allow complete dissolution. 0.86 g 2-mercaptobenzothiazole was dissolved in 75 cm$^3$ dichloromethane at 30° C. This constituted solution C. Half of solution C was added to solution A at 35° C. Solution B was then added slowly with stirring over ten minutes in 20 cm$^3$ fractions to this mixture. 30 seconds after each addition of solution B, 4 cm$^3$ of the remainder of solution C was added to the combined mixture. The mixture was then kept at 35° C. for a further 10 minutes. The mixture was then allowed to settle, the supernatant decanted and the residue was centrifuged. After excess solvent was removed, the resultant slurry was dried at 60° C. under vacuum. The yield of capped ZnS was 3.02 g.

EXAMPLE 3

190 mL distilled water and 380 mL iso-propanol were mixed together. This was then divided into two batches. Batch A comprised ⅔ the combined mixture and batch B comprised ⅓ the combined mixture. 5.51 g zinc acetate was added to batch A to make solution A and 7.36 g $Na_2S$ (60-62% assay) was added to batch B to make solution B. Both were covered and heated to 30-35° C. to allow complete dissolution. 1.23 g tetramethylthiuram disulfide was dissolved in 75 cm$^3$ dichloromethane at 30° C. This constituted solution C.

Half of solution C was added to solution A at 35° C. Solution B was then added slowly over ten minutes in 20 cm$^3$ fractions to this mixture. 30 seconds after each addition of solution B, 4 cm$^3$ of the remainder of solution C was added to the combined mixture. The mixture was then kept at 35° C. for a further 10 minutes. The mixture was then allowed to settle, the supernatant decanted and the residue was centrifuged. After excess solvent was removed, the resultant slurry was dried at 60° C. under vacuum. The yield of capped ZnS was 2.81 g.

EXAMPLE 4

190 mL distilled water and 380 mL iso-propanol were mixed together. This was then divided into two batches. Batch A comprised ⅔ the combined mixture and batch B comprised ⅓ the combined mixture. 5.50 g zinc acetate was added to batch A to make solution A and 7.31 g $Na_2S$ (60-62% assay) was added to batch B to make solution B. Both were covered and heated to 30-35° C. to allow complete dissolution. 1.52 g tetraethylthiuram disulfide was dissolved in 75 cm$^3$ dichloromethane at 30° C. This constituted solution C. Half of solution C was added to solution A at 35° C. Solution B was then added slowly with stirring over ten minutes in 20 cm$^3$ fractions to this mixture. 30 seconds after each addition of solution B, 4 cm$^3$ of the remainder of solution C was added to the combined mixture. The mixture was then kept at 35° C. for a further 10 minutes. The mixture was then allowed to settle, the supernatant decanted and the residue was centrifuged. After excess solvent was removed, the resultant slurry was dried at 60° C. under vacuum. The yield of capped ZnS was 2.87 g.

EXAMPLE 5

190 mL distilled water and 380 mL iso-propanol were mixed together. This was then divided into two batches. Batch A comprised ⅔ the combined mixture and batch B comprised ⅓ the combined mixture. 5.52 g zinc acetate was added to batch A to make solution A and 7.33 g Na₂S (60-62% assay) was added to batch B to make solution B. Both were covered and heated to 30-35° C. to allow complete dissolution. 1.34 g N-cyclohexylthiophthalimide was dissolved in 75 cm³ dichloromethane at 30° C. This constituted solution C. Half of solution C was added to solution A at 35° C. Solution B was then added slowly with stirring over ten minutes in 20 cm³ fractions to this mixture. 30 seconds after each addition of solution B, 4 cm³ of the remainder of solution C was added to the combined mixture. The mixture was then kept at 35° C. for a further 10 minutes. The mixture was then allowed to settle, the supernatant decanted and the residue was centrifuged. After excess solvent was removed, the resultant slurry was dried at 60° C. under vacuum. The yield of capped ZnS was 2.91 g.

EXAMPLE 6

190 mL distilled water and 380 mL iso-propanol were mixed together. This was then divided into two batches. Batch A comprised ⅔ the combined mixture and batch comprised ⅓ the combined mixture. 8.03 g cadmium acetate was added to batch A to make solution A and 7.36 g Na₂S (60-62% assay) was added to batch B to make solution B. Both were covered and heated to 30-35° C. to allow complete dissolution. 0.85 g 2-mercaptobenzothiazole was dissolved in 75 cm³ dichloromethane at 30° C. This constituted solution C. Half of solution C was added to solution A at 50° C. Solution B was then added slowly with stirring over ten minutes in 10 cm³ fractions to this mixture. 30 seconds after each addition of solution B, 2 cm³ of the remainder of solution C was added to the combined mixture. The mixture was then kept at 50° C. for a further 10 minutes. The mixture was then allowed to settle, the supernatant decanted and the residue was centrifuged. After excess solvent was removed, the resultant slurry was dried at 60° C. under vacuum. The yield of capped CdS was 6.50 g.

EXAMPLE 7

25 mL distilled water and 75 mL iso-propanol were mixed together. 1.47 g CdCl₂ was dissolved in this solution. 1.34 g 2-mercaptobenzothiazole was dissolved in 75 cm³ dichloromethane at 30° C. Half the MBT was added to the CdCl₂ solution and the mixture heated to 50° C. An excess of hydrogen sulfide gas was bubbled through the resultant mixture while the mixture was stirred by a magnetic follower. Simultaneously the remaining half of the 2-mercaptobenzothiazole/dichlormethane solution was added to the mixture dropwise over 30 min. The mixture was then allowed to settle, the supernatant decanted and the residue was centrifuged. After excess solvent was removed, the resultant slurry was dried at 60° C. under vacuum. The yield of capped CdS was 0.64 g.

The invention claimed is:

1. A method for the preparation of a functionalized nano size cadmium or zinc oxide or sulfide particle comprising the following steps:
   a. providing a ternary solvent system comprising a polar solvent, a non-polar solvent and an intermediate solvent allowing miscibility of all three components;
   b. providing a mixture of a transition metal salt and the ternary solvent, the transition metal salt selected from the group consisting of zinc acetate and cadmium acetate;
   c. providing a mixture of a suitable source of oxide or sulfide and the ternary solvent, the suitable source of oxide or sulfide selected from the group consisting of NaOH (sodium hydroxide), LiOH (lithium hydroxide), KOH (potassium hydroxide), NH₄OH (ammonium hydroxide), Na₂S (sodium sulfide), Li₂S (lithium sulfide), K₂S (potassium sulfide) and thioacetamide;
   d. providing a mixture of a non-polar end capping agent and the non-polar solvent, the non-polar end capping agent selected from the group consisting of 2-mercaptobenzothazole, bis-benzothiazole-2-2'-disulfide, N-oxydiethylene-2-benzothiazolesulphenamide, N-oxydiethylenethiocarbomoyl-N-oxydiethylene sulphenamide, tetramethyl thiuram disulfide, tetramethyl thiuram monosulfide, tetraethyl thiuram disulfide, tetraethyl thiuram monosulfide, tetrabenzyl thiuram disulfide, tetrabenzyl thiuram monosulfide, tetrabutyl thiuram disulfide, tetrabutyl thiuram monosulfide, tetraisopropyl thiuram disulfide, tetraisopropyl thiuram monosulfide, N-cyclohexylthiophthalimide, N-cyclohexyl-2-benzothiazole sulfenamide, N-tert-butyl-2-benzothiazole sulfenamide, 4-morpholinyl-2-benzothiazole disulfide, dipentamethylene thiuram disulfide, dipentamethylene thiuram monosulfide, dipentamethylene thiuram tetrasulfide, 4,4'- dithiomorpholine, 2-mercaptotoluimidazole, ethylene thiourea, trimethylthiourea, 1,3-diethylethlourea and 1,3-dibutylthiourea;
   e. mixing the mixtures; and
   f. recovering the resultant functionalized nano size cadmium or zinc oxide or sulfide particle.

2. The method as claimed in claim 1 wherein step (e) comprises mixing (b) and (c) to create mixture (e) and adding (d) to (e) before the resultant functionalized nano size transition metal oxide or sulfide particle is recovered.

3. The method as claimed in claim 1 wherein step (e) comprises adding a portion of (d) to (b) and adding either (c) or (d) to precipitate an oxide or sulfide.

4. The method according to claim 1 wherein the ternary solvent system is a water/alcohol/chlorinated alkane system.

5. The method according to claim 1 wherein the solvents are selected from ethanol, methanol, n-propanol, iso-propanol, ethylene glycol, butanol, chloroform, dichloromethane and dichloroethane.

6. The method according to claim 1 wherein the ternary solvent system is a water/iso-propanol/dichloromethane system.

7. The method according to claim 6 wherein the ternary solvent system comprises a ratio of 60:30:10 parts by weight iso-propanaol:water:dichloromethane.

8. The method according to claim 7 wherein the dichloromethane does not exceed 20% parts by weight.

9. The method according to claim 8 wherein the dichloromethane does not exceed 15% parts by weight.

10. The method according to claim 9 wherein the dichloromethane does not exceed 10% parts by weight.

11. The method according to claim 10 wherein the dichloromethane is present in an amount of 1-10% parts by weight.

12. The method according to claim 11 wherein the ternary solvent system comprises 20-30% parts by weight water, 60-80% parts by weight iso-propanol and 1-10% parts by weight dichloromethane.

13. The method according to claim 1 wherein the transition metal salt is soluble.

14. The method according to claim 1 wherein the reaction temperature for solubilization of the transition metal salt is between the freezing and boiling points of the ternary solvent system.

15. The method according claim 14 wherein the lower reaction temperature is 0° C. or higher.

16. The method according to claim 15 wherein the reaction temperature is between 30° C. and 50° C.

17. The method according to claim 1 wherein the reaction time is 30 seconds or less prior to the addition of the non-polar capping agent.

18. The method according to claim 1 further comprising the step of heating (f) under vacuum allowing the non-polar solvent to be removed.

19. The method of claim 18 further comprising the step of centrifuging and drying a resultant mixture of oxide and/or sulfide.

20. The method according to claim 1 wherein amounts of reagent used are stochiometrically determined.

21. The method of claim 20 wherein the amount of non-polar capping agent used is no more than 0.15 times the amount of transition metal salt.

22. The method according to claim 1 wherein the non-polar end capping agent is tetramethylthiuram (TMTD).

23. The method according to claim 1 wherein non-polar end capping agent is N-cyclohexylthiopthalimide (CTP).

24. The method according to claim 1 wherein $Na_2S$ is used to produce ZnS.

25. The method according to claim 1 wherein $H_2S$ gas is used to produce ZnS.

26. The method according to claim 1 wherein cadmium acetate is used to produce CdS.

27. A method for the preparation of a functionalized nano size cadmium or zinc or sulfide particle the method comprising the following steps:
    a. providing a ternary solvent system comprising a polar solvent, a non-polar solvent and an intermediate solvent allowing miscibility of all three components;
    b. dividing the mixed ternary solvent system into two portions;
    c. providing a mixture of a transition metal salt and one portion of the mixed ternary solvent system, the transition metal salt selected from the group consisting of zinc acetate and cadmium acetate;
    d. providing a mixture of a suitable source of oxide or sulfide and the other portion of the mixed ternary solvent system, the suitable source of oxide or sulfide selected from the group consisting of NaOH (sodium hydroxide), LiOH (lithium hydroxide), KOH (potassium hydroxide), $NH_4OH$ (ammonium hydroxide), $Na_2S$ (sodium sulfide), $Li_2S$ (lithium sulfide), $K_2S$ (potassium sulfide) and thioacetamide;
    e. providing a mixture of a non-polar end capping agent and the non-polar solvent, the non-polar end capping agent selected from the group consisting of 2-mercaptobenzothazole, bis-benzothiazole-2-2'-disulfide, N-oxydiethylene-2-benzothiazolesulphenamide, N-oxydiethylenethiocarbomoyl-N-oxydiethylene sulphenamide, tetramethyl thiuram disulfide, tetramethyl thiuram monosulfide, tetraethyl thiuram disulfide, tetraethyl thiuram monosulfide, tetrabenzyl thiuram disulfide, tetrabenzyl thiuram monosulfide, tetrabutyl thiuram disulfide, tetrabutyl thiuram monosulfide, tetraisopropyl thiuram disulfide, tetraisopropyl thiuram monosulfide, N-cyclohexylthiophthalimide, N-cyclohexyl-2-benzothiazole sulfenamide, N-tert-butyl-2-benzothiazole sulfenamide, 4-morpholinyl-2-benzothiazole disulfide, dipentamethylene thiuram disulfide, dipentamethylene thiuram monosulfide, dipentamethylene thiuram tetrasulfide, 4,4'- dithiomorpholine, 2-mercaptotoluimidazole, ethylene thiourea, trimethylthiourea, 1,3-diethylthlourea and 1,3-dibutylthiourea;
    f. mixing a portion of (e) to (c);
    g. adding (d) and the remainder of (e) alternatively to (f); and
    h. recovering the resultant functionalized nano size cadmium or zinc or sulfide particle.

* * * * *